United States Patent [19]

Lindley

[11] 4,335,535
[45] Jun. 22, 1982

[54] RODENT TRAP

[76] Inventor: Donald C. Lindley, 3 Skipper, Irvine, Calif. 92714

[21] Appl. No.: 267,610

[22] Filed: May 26, 1981

Related U.S. Application Data

[63] Continuation of Ser. No. 127,853, Mar. 6, 1980, abandoned.

[51] Int. Cl.³ .................... A01M 23/18; A01M 23/22
[52] U.S. Cl. ........................................................ 43/61
[58] Field of Search ................. 220/335; 43/60–61, 43/67, 62, 68, 73, 77, 78

[56] References Cited

U.S. PATENT DOCUMENTS

| | | | |
|---|---|---|---|
| 1,242,462 | 10/1917 | Mester | 43/61 |
| 2,502,836 | 4/1950 | Eggering | 43/61 |
| 2,774,175 | 12/1956 | Maddocks | 43/61 |
| 2,824,405 | 2/1958 | Brooks | 43/61 |
| 3,823,504 | 7/1974 | Dosch | 43/61 |
| 3,975,857 | 9/1976 | Branson | 43/61 |
| 4,142,320 | 3/1979 | Marolina | 43/61 |
| 4,291,486 | 9/1981 | Lindley | 43/61 |

Primary Examiner—Stephen G. Kunin
Assistant Examiner—K. Bradford Adolphson
Attorney, Agent, or Firm—LaValle D. Ptak

[57] ABSTRACT

A rodent trap comprised of an enclosure having a hinged lid for sealing the enclosure and an automatic closing mechanism for automatically closing the lid when a rodent enters the trap. The closing mechanism is comprised of a platform in the enclosure and a latch means for latching the platform in a fixed position. The latch is connected to the lid so that weight applied to the platform trips the latch and closes the lid sealing the container and trapping the rodent inside the enclosure.

6 Claims, 3 Drawing Figures

RODENT TRAP

This is a continuation of application Ser. No. 127,853, filed Mar. 6, 1980, now abandoned.

BACKGROUND OF THE INVENTION

This invention relates to a rodent trap which captures the rodent inside an enclosure for clean and humane disposal.

Present methods of capturing or disposing of rodents are generally unsightly and unsanitary. One such method includes a trap which has a spring operated bar for instantly killing the rodent. This type of trap includes a spring operated bar which is released by a trigger which is baited. As mice and other rodents are typically nocturnal animals such devices most frequently capture the animals at night or during periods when people are not around. This means the rodent may lie in the trap for many hours before removal and disposal. In addition to being unsightly this is unsanitary as rodents are known to carry disease causing bacteria which can be spread after the animal is killed.

Another method of disposing of the rodents is by using poison bait. This type of method uses poisoned bait which poisons the rodent killing him and sometimes includes a substance which dehydrates the rodent. A disadvantage of this method is that the rodent may crawl into some inaccessible area after eating the poison and die there. This prevents disposal of the dead rodent.

The purpose of the present invention is to provide a rodent trap which is simple and easy to use and humanely captures and disposes of a rodent in a sanitary manner.

The present invention is comprised of an enclosure having a hinged lid which is automatically closed when a rodent enters the enclosure. The hinged lid is automatically closed by a movable platform which is latched in a fixed position and is coupled through a hinge mechanism to the lid such that weight applied to the platform trips the latch and automatically closes the lid. The tripping mechanism is comprised of the platform which is inside the enclosure, free to effect rotational and vertical movement, a latch mechanism and a rod hingedly connected to the lid at one end and to the latch at the other end. The latch is attached to the shelf in a manner which causes weight from the shelf to trip the latch closing the lid. After closure, weight of the platform biases the lid toward its closed position.

It is one object of the present invention to provide a rodent trap which captures and encloses the rodent in a sealed container.

These and other objects of the invention become apparent from the following description when considered in conjunction with the accompanying drawings wherein.

Figure 2:
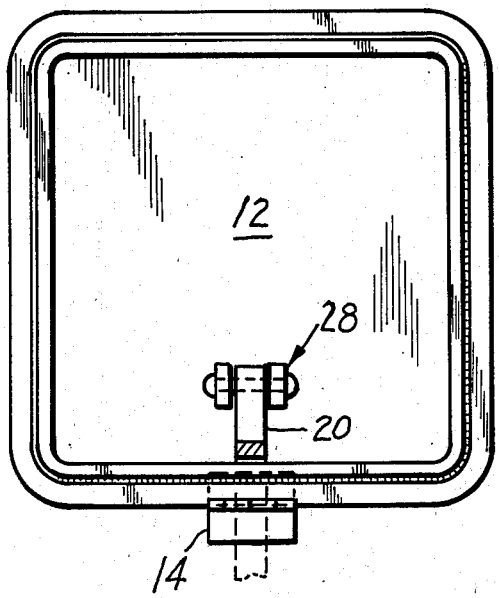
FIG. 2 is a sectional view taken at 2—2 of FIG. 1.

The rodent trap of the present invention is comprised of an enclosure 10 having a lid 12 for sealing the enclosure attached by means of a hinge 14. The lid is closed by an automatic tripping mechanism comprised of a platform 16, having openings 17, a latching mechanism 18 and a rod 20 connecting the latching mechanism 18 to the lid 12. The openings 17 permit the rodent to easily view the bait 36.

The latching mechanism 18 is comprised of a hook 22 and a stop 24 for engagement by the hook. Weight applied to the platform 16 causes the hook 22 to slide off the stop 24 actuating closing of the lid 12.

This is accomplished by means of the connecting rod 20 attached by means of a hinge 26 at one end to the latching mechanism 18 and to the lid 12 at the other end by means of a hinge mechanism 28.

Figure 1:
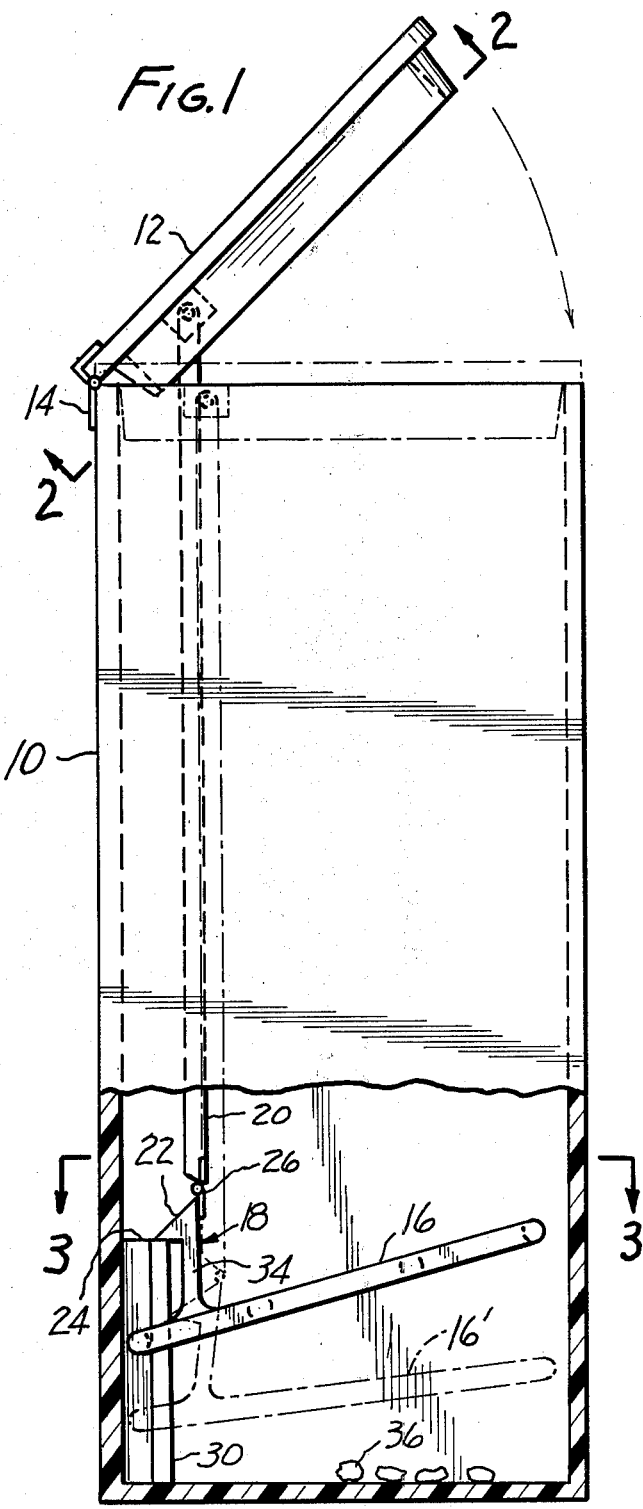
FIG. 1 is a side elevation in partial section of the rodent trap according to the invention.
Figure 3:
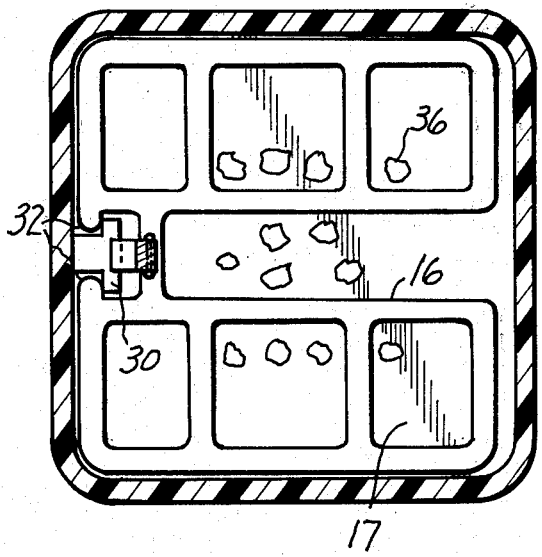
FIG. 3 is a sectional view taken at 3—3 of FIG. 1.

The platform 16 is free to rotate as well as to move up and down vertically. A guide means in the form of a guide rail 30 is provided to control the rotational and up-and-down movement of platform 16. Knobs 32 on the shelf 16 engage the guide rail 30 as shown in FIG. 3 to control the movement of the platform 16. The hook 22 of the latch mechanism 18 is connected to the platform by an arm 34. The arm 34 is fixedly attached to the platform 16 at an angle of less than 90% such that when the hook 22 is engaged with the stop 24 the shelf is tilted slightly upward as illustrated in FIG. 1.

The operation of the device is as follows. Bait 36 is placed in the bottom of the enclosure 10 and the lid positioned as illustrated in FIG. 1 with the latching mechanism 18 engaged to hold the shelf 16 in a fixed position as shown. That is, the platform 16 is tilted slightly upward. When a rodent enters the enclosure 10 and drops down inside on to the platform 16 the platform rotates on the pinless hinge formed by the guide rail 30 and the knobs 32. This will cause the hook 22 to slide off the stop 24, causing the platform 16 to drop to the position illustrated in phantom at 16'. This pulls the connecting rod 20 downward, closing and sealing the lid 12 and capturing the rodent inside the enclosure. No latch is needed to hold the lid in a closed position because the weight of the rodent on shelf 16 will maintain the lid closed. If the rodent should attempt to jump up and open the lid it would fall back on the shelf and close it again. After a period of time, the rodent will expire in the enclosure 10 from suffication or heat prostration. The rodent may now be disposed of in a sanitary manner by either disposing of the entire enclosure or opening the enclosure and disposing of the rodent after it has expired.

This invention is not to be limited by the embodiment shown in the drawings and described in the description, which is given by way of example and not of limitation, but only in accordance with the scope of the appended claims.

I claim:
1. A rodent trap comprising:
   an enclosure having a top and a bottom;
   a hinged lid adapted to seal the top of said enclosure;
   closing means for closing said lid comprising a movable platform means in said enclosure, said platform being free to rotate and also to move vertically;
   latch means for latching said platform in a restrained position spaced from the bottom of said enclosure;
   vertical rail means attached to a wall of said enclosure for guiding the rotational and vertical movement of said platform;
   knob means on said platform for engagement with said rail means for guiding said platform vertically; and
   connecting means connecting said platform to said lid, whereby weight applied to said platform moves said platform downwardly toward the bottom of said enclosure, releases said latch and closes said lid by the force of the weight applied to said platform.

2. Apparatus according to claim 1 in which the upper end of said rail means comprises said stop means.

3. Apparatus according to claim 2 in which said connecting means comprises a rod hingedly attached to said lid at one end and to said latch at the other end.

4. Apparatus according to claim 1 in which said guide means is adapted to permit said platform to effect rotational and up and down movement simultaneously.

5. Apparatus according to claim 4 wherein said latch means is adapted to latch said platform in a slightly upward angled position whereby rotation of said platform trips said latch.

6. Apparatus according to claim 5 wherein said hook is integrally attached to said platform at an angle of less than 90% whereby engagement of said hook effects a slightly upward angle of said platform.

* * * * *